United States Patent
Gooden (10) Patent No.: US 10,942,328 B2
(45) Date of Patent: Mar. 9, 2021

(54) FLEXURED SUSPENSION SYSTEM FOR MOUNTED STRUCTURES OR ASSEMBLIES

(71) Applicant: Raytheon Company, Waltham, MA (US)

(72) Inventor: Dominic R. Gooden, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 15 days.

(21) Appl. No.: 16/390,642

(22) Filed: Apr. 22, 2019

(65) Prior Publication Data
US 2020/0333546 A1    Oct. 22, 2020

(51) Int. Cl.
*G02B 7/00* (2006.01)
*F16F 15/06* (2006.01)

(52) U.S. Cl.
CPC .............. *G02B 7/008* (2013.01); *F16F 15/06* (2013.01)

(58) Field of Classification Search
CPC ..... F16C 11/12; F16C 2370/20; F16F 15/073; F16F 15/063; B64G 2001/228; G02B 7/008
USPC .......................................................... 248/560
See application file for complete search history.

(56) References Cited

U.S. PATENT DOCUMENTS

| | | | |
|---|---|---|---|
| 2,793,028 A * | 5/1957 | Wheeler | F16C 11/12 267/160 |
| 3,700,289 A | 10/1972 | Bilinski et al. | |
| 4,062,600 A | 12/1977 | Wyse | |
| 4,269,072 A | 5/1981 | Duncan | |
| 4,637,596 A * | 1/1987 | Lewis | F16C 11/12 267/160 |
| 5,310,157 A * | 5/1994 | Platus | F16F 3/026 248/619 |

(Continued)

FOREIGN PATENT DOCUMENTS

| | | |
|---|---|---|
| GB | 2441339 A | 3/2008 |
| WO | WO 99/22260 A1 | 5/1999 |
| WO | WO 2014/028297 A1 | 2/2014 |

OTHER PUBLICATIONS

Awtar et al., Flexure Systems based on a Symmetric Diaphragm Flexure, http://psdl.engin.umich.edu/pdf/ASPE_1803.pdf, Precision Engineering Research Group, to the best of the applicant's knowledge article was available before the application filing date, 4 pages, Massachusetts Institute of Technology, Cambridge, MA.

(Continued)

*Primary Examiner* — Bradley Duckworth (57) ABSTRACT

The flexure mount system is disclosed that can accommodate thermal expansion. The flexure mount can include a base, a first flexure mount coupled to the base, a second flexure mount coupled to the base, and a supported structure coupled to the first and second flexure mounts along an axis. The first flexure mount can have a first radial flexure. The second flexure mount can have a second radial flexure and an axial flexure. The first and second radial flexures can be operable to provide radial compliance relative to the axis and the axial flexure can be operable to provide axial compliance parallel to the axis, such that the first flexure mount is radially compliant, and the second flexure mount is radially and axially compliant.

28 Claims, 7 Drawing Sheets

(56) References Cited

U.S. PATENT DOCUMENTS

| | | | | |
|---|---|---|---|---|
| 7,093,827 | B2* | 8/2006 | Culpepper | F16C 11/12 |
| | | | | 267/160 |
| 7,135,804 | B2 | 11/2006 | Yang | |
| 7,364,145 | B2* | 4/2008 | Knirck | F16F 1/027 |
| | | | | 267/160 |
| 7,699,296 | B1* | 4/2010 | Knollenberg | G02B 26/06 |
| | | | | 267/158 |
| 8,795,572 | B2* | 8/2014 | Shilpiekandula | B82Y 10/00 |
| | | | | 264/293 |
| 9,057,425 | B2* | 6/2015 | Hendershott | F16H 21/04 |
| 9,664,562 | B1 | 5/2017 | Goodnough et al. | |
| 9,733,027 | B2* | 8/2017 | Platus | F28F 9/26 |
| 9,739,354 | B2* | 8/2017 | Hendershott | F16H 21/04 |
| 2014/0048240 | A1* | 2/2014 | Platus | B64G 1/50 |
| | | | | 165/185 |
| 2014/0123786 | A1 | 5/2014 | Hendershott | |
| 2017/0191521 | A1* | 7/2017 | Hopkins | G01J 3/4535 |
| 2020/0200211 | A1* | 6/2020 | Gallagher | F16C 11/12 |

OTHER PUBLICATIONS

Awtar et al., Parasitic Error-free Symmetric Diaphragm Flexure, and a set of precision compliant mechanisms based it: Three and Five DOF flexible torque couplings, Five DOF motion stage, single DOF linear/axial bearing, http://www-personal.umich.edu/~awtar/PHD/Diaphragm.pdf, to the best of the applicant's knowledge article was available before the application filing date, 12 pages, Massachusetts Institute of Technology, Cambridge, MA.

Pollard, Design of a Flexure Mount for Optics in Dynamic and Cryogenic Environments, https://ntrs.nasa.gov/archive/nasa/casi.ntrs.nasa.gov/19890016654.pdf, Ames Research Center, Feb. 1989, 136 pages, National Aeronautics and Space Administration, Washington, DC.

International Search Report for International Application No. PCT/US2020/019353 dated Jun. 17, 2020, 13 pages.

* cited by examiner

FLEXURED SUSPENSION SYSTEM FOR MOUNTED STRUCTURES OR ASSEMBLIES

BACKGROUND

Optical devices (e.g., integrated Dewar cooler assemblies (IDCAs)) are often mounted on platforms, such as missiles, aircraft, etc., which are subjected to dynamic loading conditions and large operational temperature ranges. Due to concerns over optical distortion and/or structural failure caused by differential thermal expansion, an optical device is often supported at only a single location. In cases where dynamic loading is large and jitter must be low, an optical device may be supported at multiple locations, however this typically constrains the optical device and supporting hardware to be made of materials having the same or very similar coefficients of thermal expansion (CTE).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although supporting an optical device at only a single location or utilizing materials with the same or similar CTEs in order to support an optical device at multiple locations can serve to support an optical device without thermally induced distortion or failure, these approaches are not without their drawbacks. An optical device supported at only a single location can be susceptible to optical element (e.g., focal plane) jitter caused by dynamic vibrations. Requiring that an optical device and supporting structures be constructed of materials with the same or similar CTEs can result in the use of materials with undesirable characteristics, for example the materials may be weaker, less stiff, heavier and/or more expensive than desired, which can be problematic in weight and/or cost sensitive applications.

Accordingly, a flexure mount system is disclosed that can enable supporting an optical device at multiple locations to minimize optical jitter while also accommodating differential thermal expansion to avoid optical distortion, alignment shifts, and/or structural failure. In one aspect, the flexure mount system can enable the use of any suitable material in the system regardless of the CTE. The flexure mount system can include a base, a first flexure mount coupled to the base, the first flexure mount having a first radial flexure, a second flexure mount coupled to the base, the second flexure mount having a second radial flexure and an axial flexure, and a supported structure coupled to the first and second flexure mounts along an axis. The first and second radial flexures can be operable to provide radial compliance relative to the axis and the axial flexure can be operable to provide axial compliance parallel to the axis, such that the first flexure mount is radially compliant, and the second flexure mount is radially and axially compliant.

In one aspect, a flexure mount can comprise a radial flexure operable to provide radial compliance relative to an axis, and an axial flexure operable to provide axial compliance parallel to the axis, such that the flexure mount is radially and axially compliant.

Figure 1:
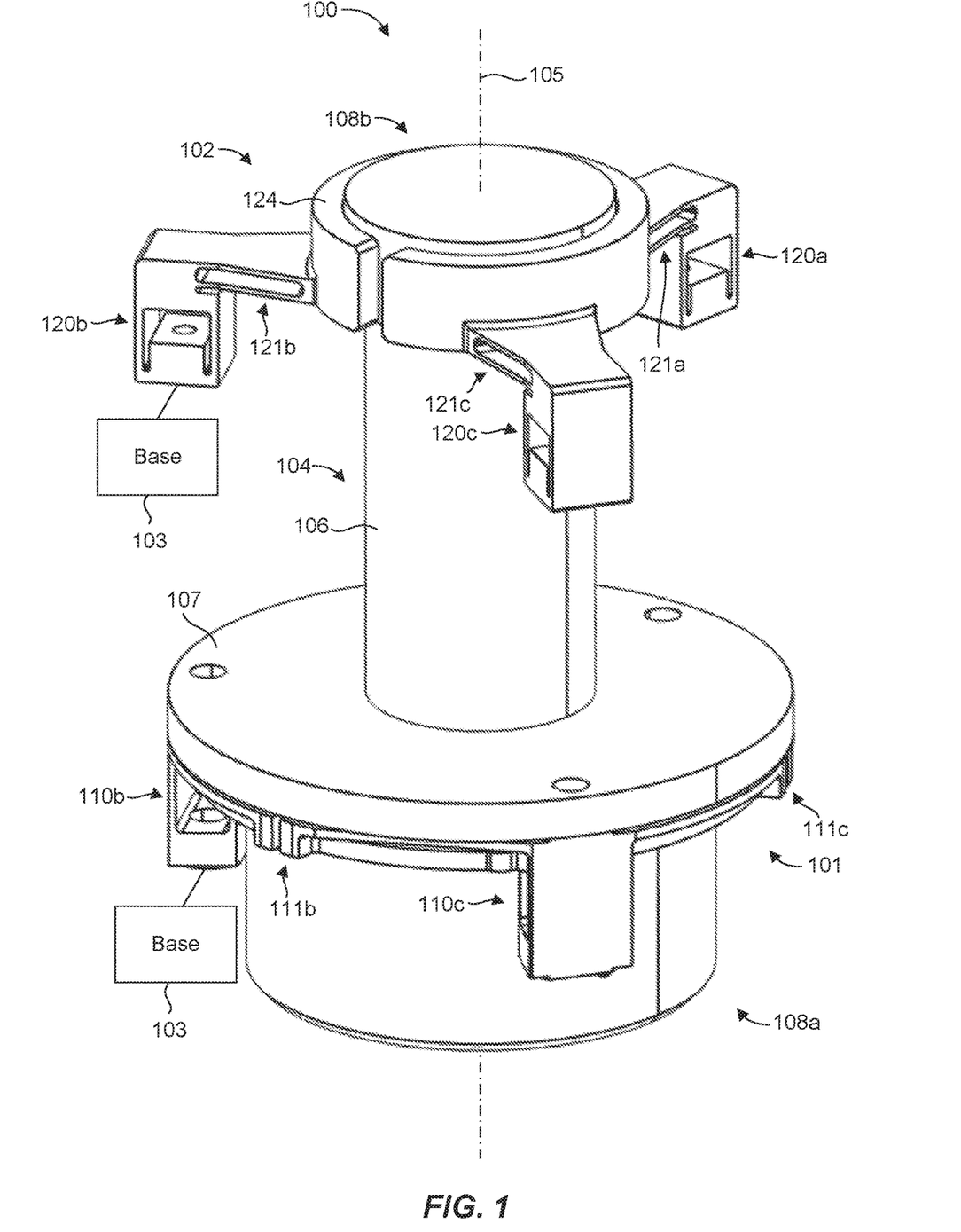
FIG. 1 is an illustration of a flexure mount system in accordance with an example of the present disclosure.
Figure 2A:
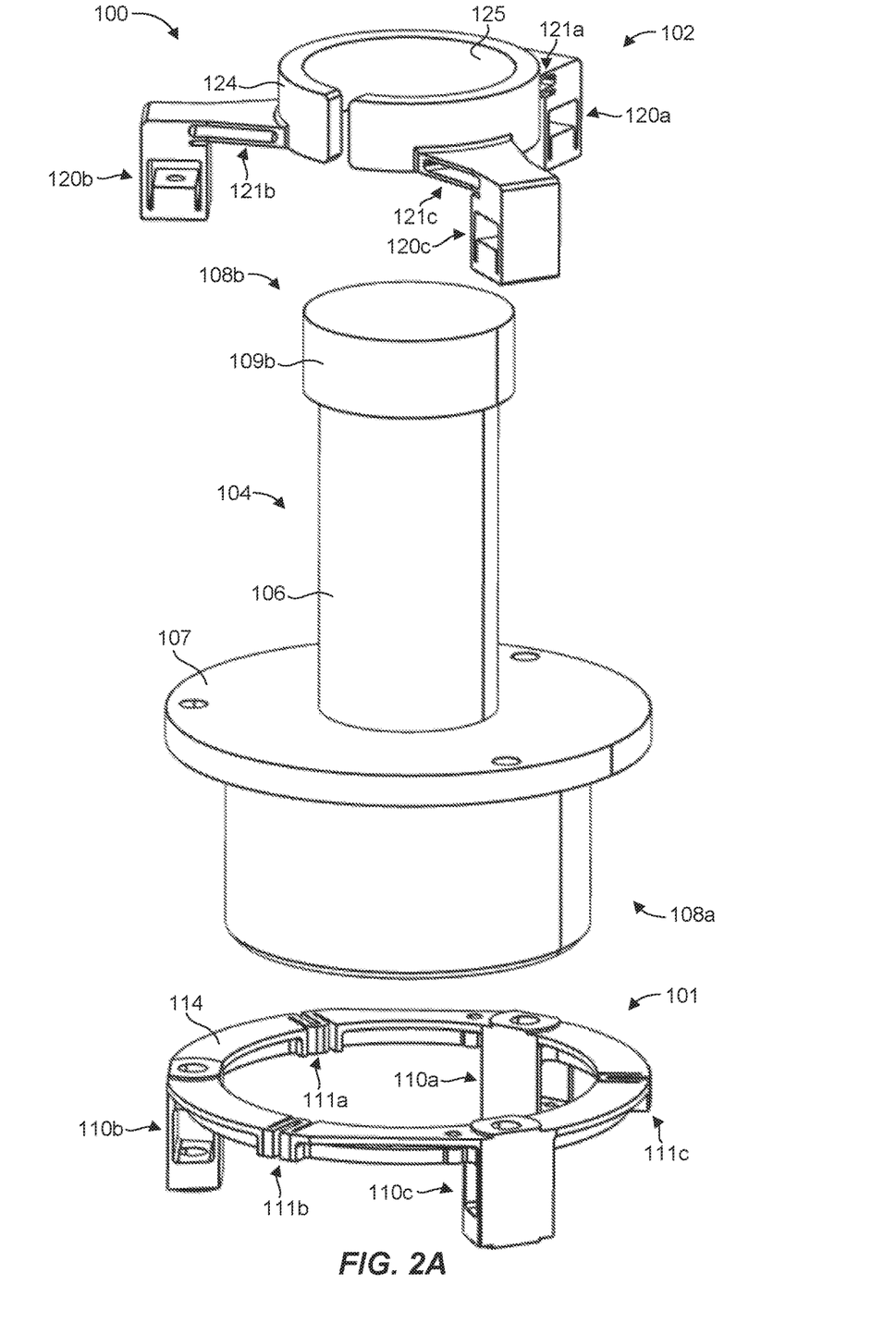
FIGS. 2A and 2B are exploded views of the flexure mount system of FIG. 1.
Figure 2B:
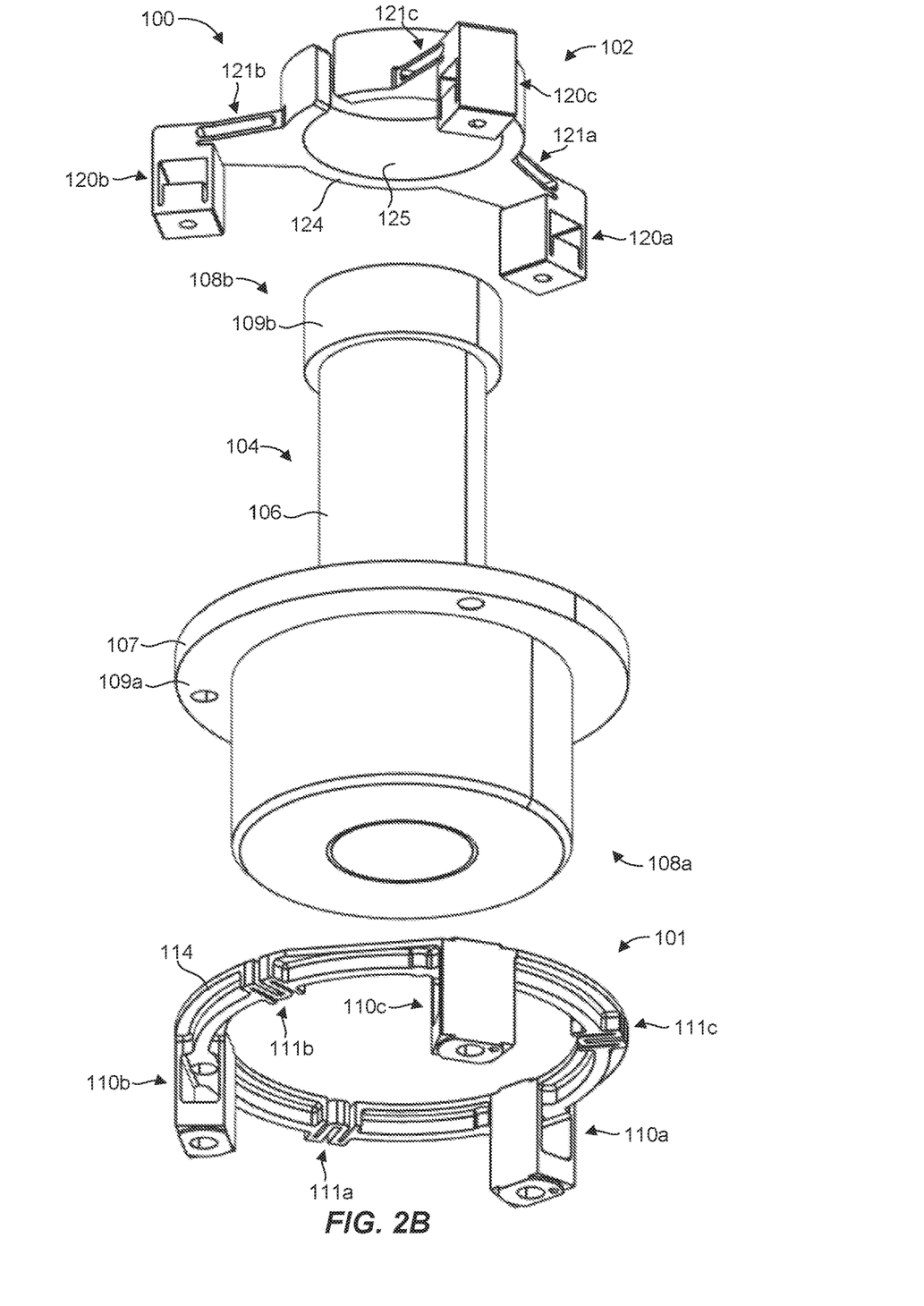
Figure 3A:
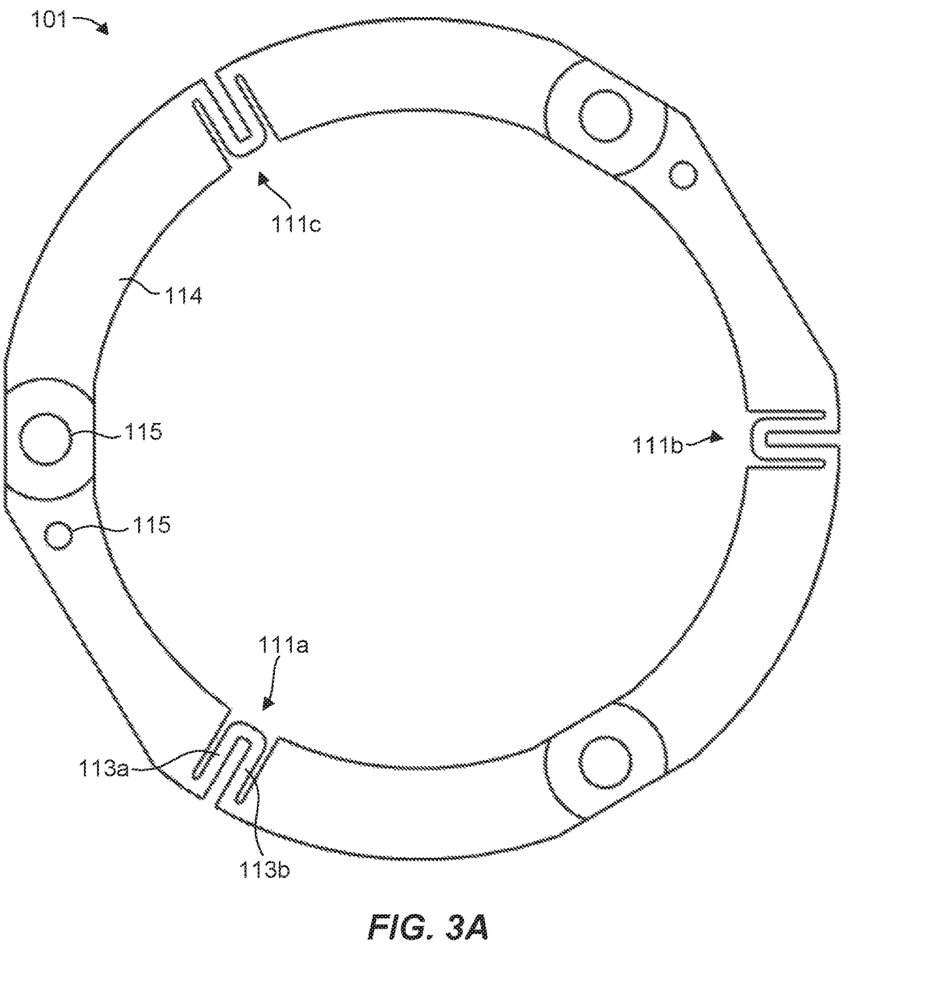
FIG. 3A shows a top view of a flexure mount of the flexure mount assembly of FIG. 1 isolated from other components, in accordance with an example of the present disclosure.
Figure 3B:
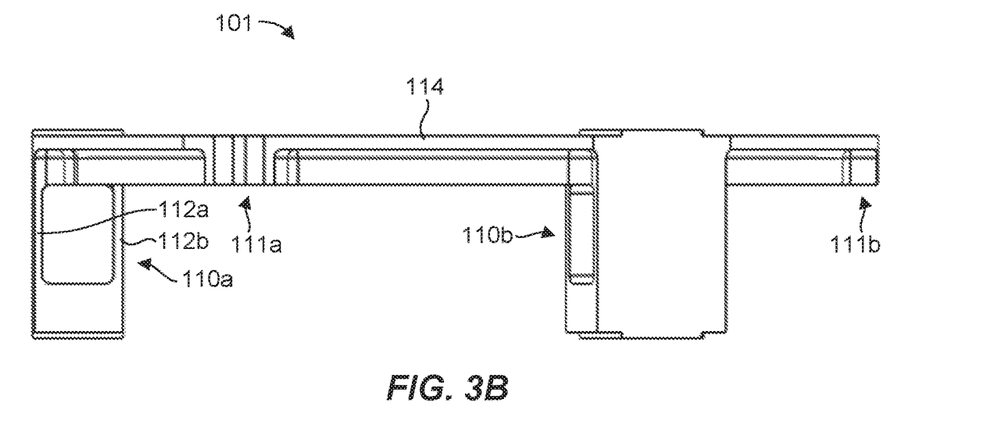
FIG. 3B shows a side view of the flexure mount of FIG. 3A.
Figure 4A:
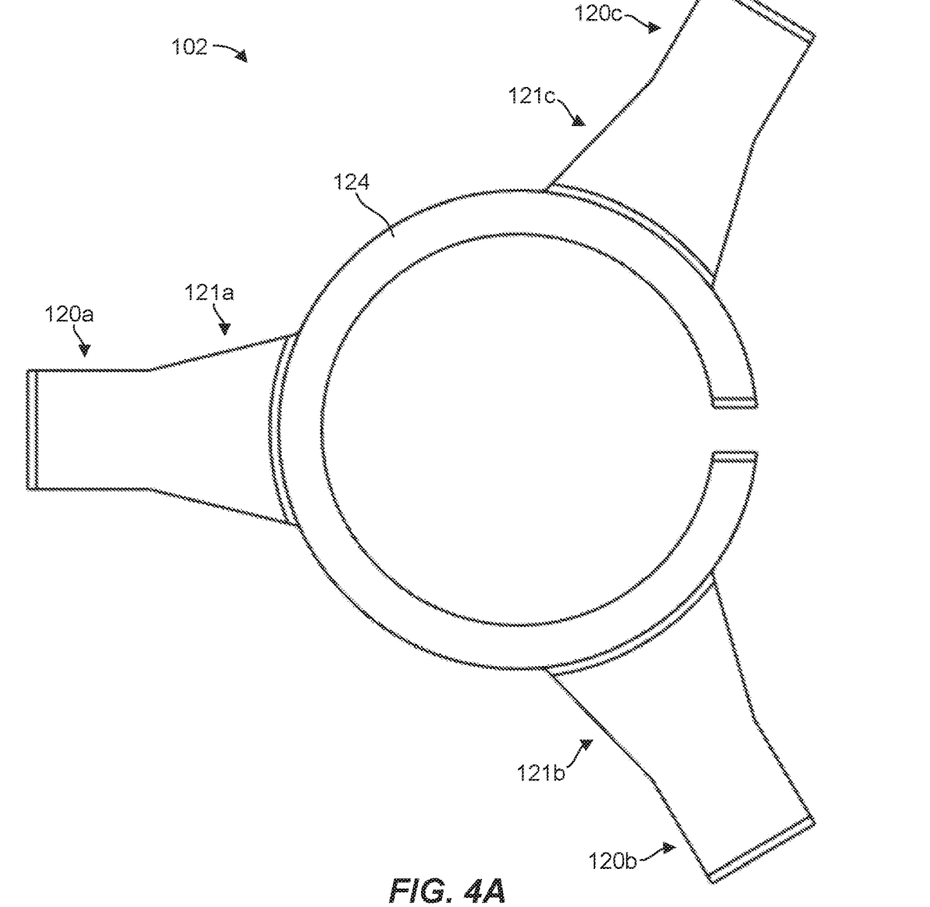
FIG. 4A shows a top view of a flexure mount of the flexure mount assembly of FIG. 1 isolated from other components, in accordance with another example of the present disclosure.
Figure 4B:
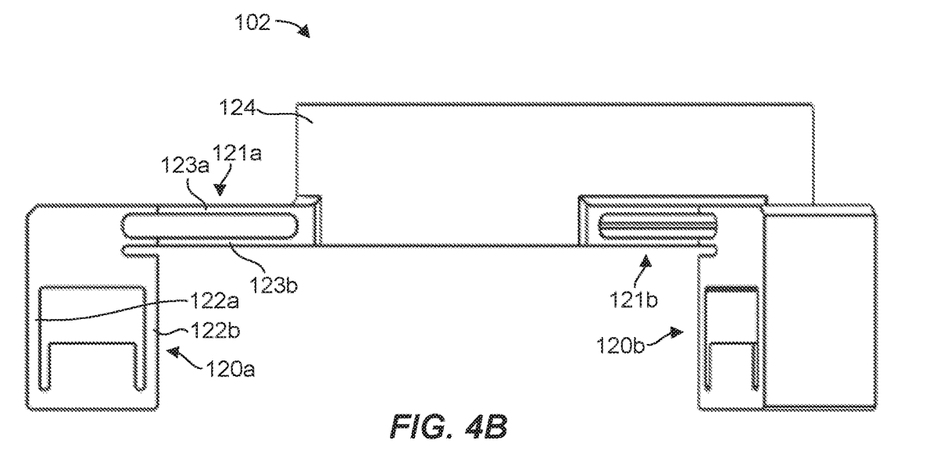
FIG. 4B shows a side view of the flexure mount of FIG. 4A.

To further describe the present technology, examples are now provided with reference to the figures. With reference to FIG. 1, one embodiment of a flexure mount system 100 is illustrated. Exploded views of the system 100 are shown in FIGS. 2A and 2B. In general, the system 100 includes flexure mounts 101, 102 coupled to a base 103 and a supported structure 104. Top and side views of a first flexure mount 101 are shown in FIGS. 3A and 3B, respectively. Top and side views of a second flexure mount 102 are shown in FIGS. 4A and 4B, respectively. The base 103 can be any structure (e.g., one or more components forming a rigid body) suitable for providing a structural base for mounting the supported structure 104. In the illustrated embodiment, the system 100 is configured as a portion of an optical assembly. In this case, the supported structure 104 is an extended optical device (e.g., an integrated Dewar cooler assembly (IDCA)) and the base is an optical bench or chassis. Although the system 100 is shown in FIGS. 1-2B and described in the context of an optical assembly, it will be recognized by those skilled in the art, and it is contemplated herein, that the system 100 can form or be part of any suitable type of device or system, such as at least a portion of an optical, electrical, mechanical, or electromechanical system. As such, the example of an optical assembly or system is not intended to be limiting in any way.

The flexure mounts 101, 102 can be coupled to the base 103 along an axis 105 (i.e., at different locations along a longitudinal axis) to provide support for the supported structure 104 under static and dynamic mechanical loading. For an optical system, supporting or constraining multiple points (e.g., opposite ends) of an optical assembly can maximize moment and translational stiffness and therefore reduce or minimize jitter in high dynamic vibration environments. In other words, providing enough stiffness in the support or constraint of the optical assembly by the structure and location of the supporting hardware (e.g., the flexure mounts 101, 102) can ensure that the resonant frequency of the optical assembly is high enough to minimize optical jitter. Such a mounting configuration can be vulnerable to induced distortions and/or structural failure when materials with different CTEs are involved and the system is mechanically over constrained. Examples of the present disclosure, however, demonstrate how such a mounting configuration can be utilized for its advantages, even when materials with different CTEs are involved, without mechanically over constraining the system.

For example, two or more of the base 103, the flexure mounts 101, 102, and the supported structure 104 can be constructed of materials having different CTEs. In one embodiment, the base 103 can be made of aluminum, the flexure mounts 101, 102 can be made of titanium, and the supported structure 104 can have a cylindrical portion 106 made of a nickel-based alloy and a flange 107 made of steel. For some precision sensor applications, there is often the need to account for differential CTE effects on supported elements relative to the main supporting structures over a wide range of environmental temperatures and vibrational loading. As described in more detail below, the supported structure 104 (i.e., a rigid body) can be rigidly supported under dynamic vibration but also supported in a manner that accommodates thermoelastic dimensional changes of the various components of the system 100. In other words, in an optical instrument application, the system 100 can provide adequate stiffness to meet jitter requirements and be compliant enough to significantly reduce CTE induced loads that would otherwise warp or damage the optical system and result in reduced or unacceptable performance.

In one aspect, the flexure mounts 101, 102 can each comprise at least one flexure operable to provide radial compliance relative to the axis 105 (i.e., radially inward/outward orthogonal to the axis 105), and the flexure mount 102 can comprise at least one flexure operable to provide axial compliance (i.e., parallel) to the axis 105. In the illustrated example, the first flexure mount 101 includes a first set of radial flexures 110a-c that are configured to be radially compliant. Similarly, the second flexure mount 102 includes a second set of radial flexures 120a-c that are configured to be radially compliant. However, the second flexure mount 102 also includes axial flexures 121a-c that are configured to be axially compliant. Thus, both flexure mounts 101, 102 are compliant radially, while one of the flexure mounts (101) is fixed axially and the other flexure mount (102) is compliant axially. This allows relative axial growth/contraction over temperature of the supported structure 104 relative to the base 103, while minimizing any stresses, or misalignments associated with such growth.

A flexure, as typically known in the mechanical arts, is a flexible element or combination of elements configured to be compliant (e.g., bending and/or torsion) in one or more specific degrees of freedom. The flexures disclosed herein can be of any suitable type or construction, such as a pin flexure, a blade flexure, a notch flexure, a beam flexure, and/or a diaphragm flexure, as known in the art. In the illustrated embodiment, the flexures 110a-c, 120a-c, 121a-c are configured as blade flexures. In particular, each of the flexures 110a-c, 120a-c, 121a-c comprises a pair of blade flexures in a parallel configuration (see, e.g., representative blade flexures 112a, 112b of the radial flexure 110a in FIG. 3B, blade flexures 122a, 122b of the radial flexure 120a in FIG. 4B, and blade flexures 123a, 123b of the axial flexure 121a in FIG. 4B). It should be recognized that the illustrated embodiment is not intended to be limiting in any way and that any of the flexures 110a-c, 120a-c, 121a-c can comprise any suitable type of flexure in any number or configuration in accordance with the principles disclosed herein.

In one aspect, the radial flexures 110a-c, 120a-c can be configured such that radial compliance is only provided for thermal expansion/contraction while providing stiffness under mechanical loads (e.g., static and/or dynamic loads, such as vibrations). For example, the radial flexures 110a-c, 120a-c can be oriented such that they are compliant radially under thermoelastic growth/contraction and such that each set or group of radial flexures 110a-c, 120a-c provides stiffness under radial or lateral mechanical loads. As illustrated, this can be accomplished by spacing three flexures (e.g., the radial flexures 110a-c or 120a-c) circumferentially about the axis 105 (e.g., equally spaced at 120 degrees from one another) and orienting each flexure for radial compliance. Because each of the radial flexures 110a-c, 120a-c can be configured to be stiff transverse to its compliant direction (i.e., the radial direction), at least two of the flexures in a group can provide stiffness that resists lateral mechanical displacements. Thus, each set or group of radial flexures 110a-c, 120a-c can provide radial compliance to accommodate thermoelastic growth or shrinkage while also providing stiffness in other (e.g., lateral) degrees of freedom for mechanical loads.

In one aspect, the first flexure mount 101 can be configured with the first set of radial flexures 110a-c to accommodate materials with different CTEs of the base 103 and the supported structure 104 in a radial direction (i.e., radially inward/outward orthogonal to the axis 105) while being stiff in an axial direction (i.e., in a direction parallel to the axis 105). In other words, the first flexure mount 101 is not configured with flexures that would allow axial compliance or movement. The first set of radial flexures 110a-c are therefore stiff or rigid in the axial direction under mechanical loads (e.g., dynamic vibration) and include no other flexures configured to provide axial compliance. Thus, a first end 108a of the supported structure 104 coupled to the first flexure mount 101 can be fixed or "grounded" axially for thermoelastic expansion/contraction and mechanical loading.

The second flexure mount 102 can be configured with the second set of radial flexures 120a-c to accommodate materials with different CTEs of the base 103 and the supported structure 104 in a radial direction (i.e., radially inward/outward orthogonal to the axis 105). However, the second flexure mount 102 can include the axial flexures 121a-c, which are configured to allow axial compliance or movement (i.e., in a direction parallel to the axis 105). As discussed above, the first flexure mount 101 is configured to axially fix the first end 108a of the supported structure 104 for thermoelastic expansion/contraction and mechanical loading. Thus, when paired with the first flexure mount 101 to support the supported structure 104, the axial flexures 121a-c of the second flexure mount 102 allow compliance or movement of a second end 108b of the supported structure 104 coupled to the second flexure mount 102 for thermoelastic expansion/contraction. Although the axial flexures 121a-c of the second flexure mount 102 are compliant in an axial direction, the axial flexures 121a-c are not flexed under mechanical loading due to the support provided by the first flexure mount 101 coupled to the first end 108a of the supported structure 104. Thus, the second flexure mount 102 allows compliance in the axial direction but only for thermoelastic growth/shrinkage, not mechanical loads, when utilized with the first flexure mount 101 to support the supported structure 104.

The flexure mounts 101, 102 can be coupled to the base 103 in any suitable manner, such as by bolting (e.g., with fasteners), clamping, bonding (e.g., with an adhesive), pinning, etc. alone or in any combination. In one aspect, tip/tilt discrepancies between mounting planes for the two flexure mounts 101, 102 can be accommodated by utilizing spherical mounting interface surfaces (e.g., spherical washers) on one or both of the flexure mounts 101, 102 and the base 103. Alternatively, a bond gap can be utilized to accommodate tip and tilt discrepancies.

The flexure mounts 101, 102 can be coupled to the supported structure 104 in any suitable manner, such as by bolting (e.g., with fasteners), damping, bonding (e.g., with an adhesive), pinning, shimming, etc. alone or in any combination. In one aspect, discrepancies in the nominal axial location between the flexure mounts 101, 102 for coupling with the supported structure 104 can be accommodated by bonding, damping, and/or shimming. For example, as shown in the illustrated embodiment, the flexure mount 102 can include a collar 124 configured to couple with the second end 108b of the supported structure 104 by bonding. The collar 124 can have an interface surface 125 configured to engage and interface with a second interface surface 109b of the supported structure 104 for coupling the second flexure mount 102 to the supported structure 104. A bonding interface can be utilized in situations where there is low thermoelastic stress between a given flexure mount 101, 102 and the supported structure 104. The materials and the size of the bond interface factor into the thermoelastic growth and resulting stress, which must be less than the stress at which a given adhesive would fail. Although the supported structure 104 and associated interfaces of the flexure mounts 101, 102 are shown having cylindrical configurations, this embodiment is only one example and is not intended to be limiting in any way.

In cases where interface thermoelastic stress would be too great, a flexure mount can be configured to accommodate thermoelastic growth/contraction between the flexure mount and the supported structure 104. For example, the first flexure mount 101 includes flexures 111a-c, which are operable to provide circumferential compliance about the axis 105, such that the first flexure mount 101 is circumferentially compliant to accommodate differential growth/contraction at the interface between the flexure mount 101 and the supported structure 104. This circumferential compliance of the first flexure mount 101 can avoid or minimize a constraint provided by the first flexure mount 101 that would tend to restrict or inhibit the radially compliant function of the first set of flexures 110a-c in accommodating differential thermal expansion/contraction between the base 103 and the supported structure 104. Thus, including the circumferentially compliant flexures 111a-c can allow the flexure mount 101 to be constructed as a single part with correctly oriented and aligned radial flexures 110a-c while still allowing these flexures to function as intended, as opposed to utilizing multiple (e.g., three) separate flexures without an intrinsic means to orient or align the individual flexures.

The flexures 111a-c can be of any suitable design or configuration. In the illustrated embodiment, the flexures 111a-c comprise a plurality of blade flexures arranged in a serpentine configuration (see, e.g., representative blade flexures 113a, 113b of the flexure 111a in FIG. 3A). The first flexure mount 101 includes a mounting ring 114 that includes mounting features or components 115 (e.g., holes or openings for fasteners, pins, etc., not shown) that are distributed about the mounting ring 114 for coupling the first flexure mount 101 to the supported structure 104. The flexures 111a-c are built into the mounting ring 114 and are located between the distributed mounting features 115. Thus, the flexures 111a-c can effectively enlarge/contract the size or diameter of the mounting ring 114 to accommodate differential thermal expansion/contraction (i.e., a CTE mismatch) between the first flexure mount 101 and the supported structure 104. The first flexure mount 101 can interface with the supported structure 104 at a first interface surface 109a on the flange 107 (see FIG. 2B). Although circumferential flexures are only shown included with the first flexure mount 101, it should be recognized that either one, both, or neither of the flexure mounts 101, 102 may include a circumferential flexure depending on the materials and size of the interface with the supported structure 104.

The flexure configurations of the flexure mounts 101, 102 disclosed herein can provide support of the supported structure 104 in a manner that restrains lateral translation (i.e., in two axes), axial translation (i.e., in a third axis), and rotation (i.e., about the three translational axes) to fully constrain the supported structure 104 for mechanical load transfer in six degrees of freedom while accommodating differential radial and axial thermoelastic displacement (e.g., thermal expansion/contraction). Although certain examples have been provided in the context of reducing or eliminating CTE mismatch induced distortion of an optical system, it should be recognized that the principles disclosed herein can be utilized in a variety of systems to provide stiffness for mechanical support of a structure as well compliance to accommodate thermoelastic displacement.

The flexure mounts 101, 102 can have any suitable form or construction and can be manufactured by any suitable process or technique (e.g., machining (e.g., milling, turning, electrical discharge, etc.), casting, forging, water jet cutting, etc.). In some embodiments (as shown in the figures), the various elements and components of the individual flexure mounts 101, 102 can be integrally formed in a single, unitary, monolithic structure, although other configurations are contemplated where separate, individual elements and components are assembled to form the flexure mounts 101, 102.

Figure 5A:
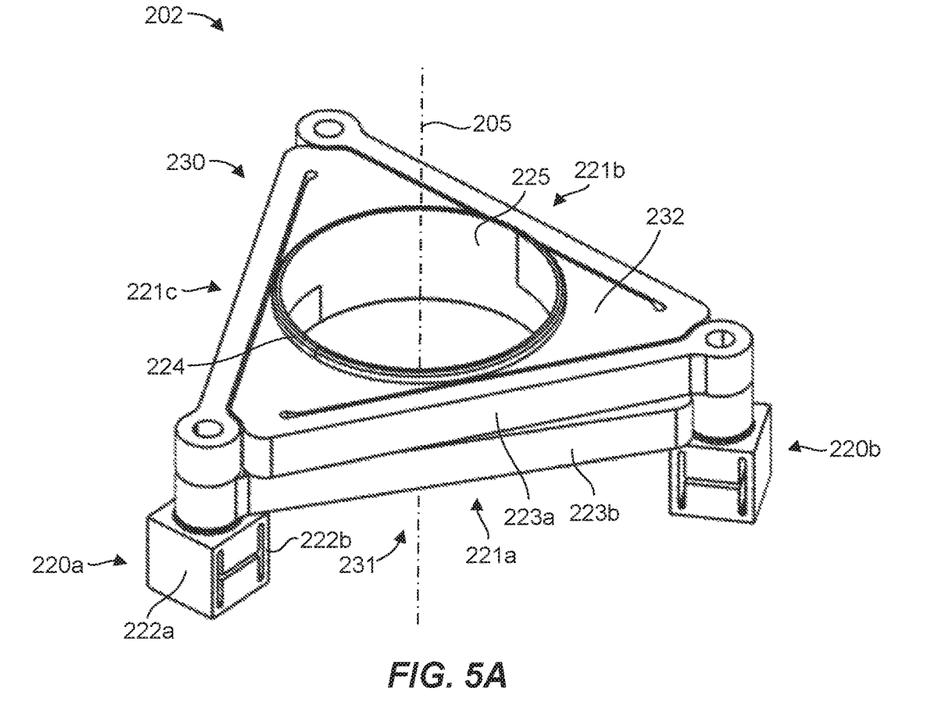
FIGS. 5A and 5B are illustrations of a flexure mount in accordance with another example of the present disclosure.
Figure 5B:
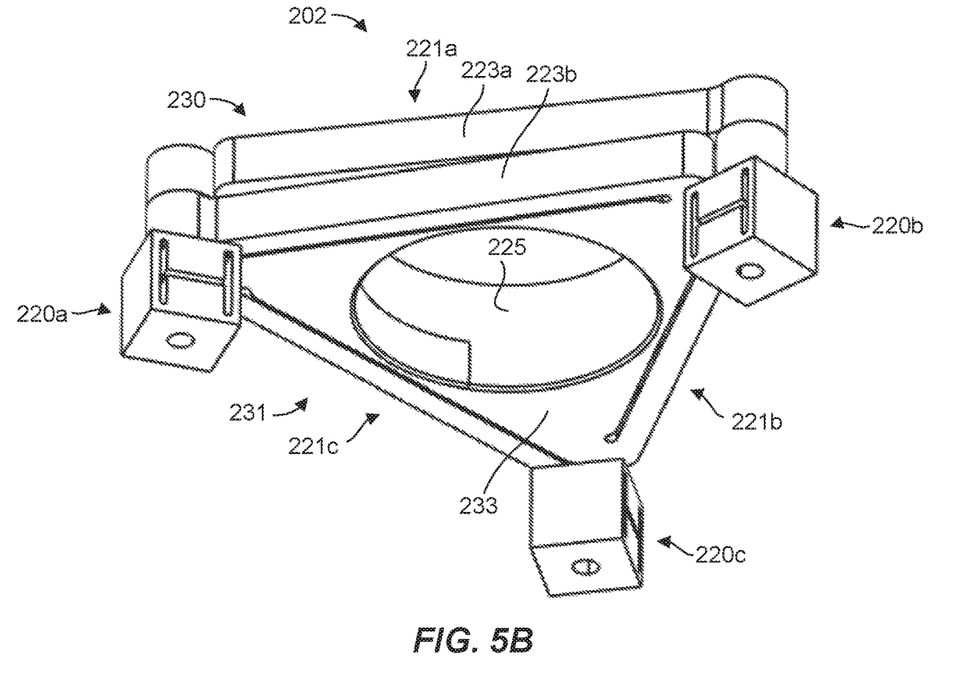
Figure 6:
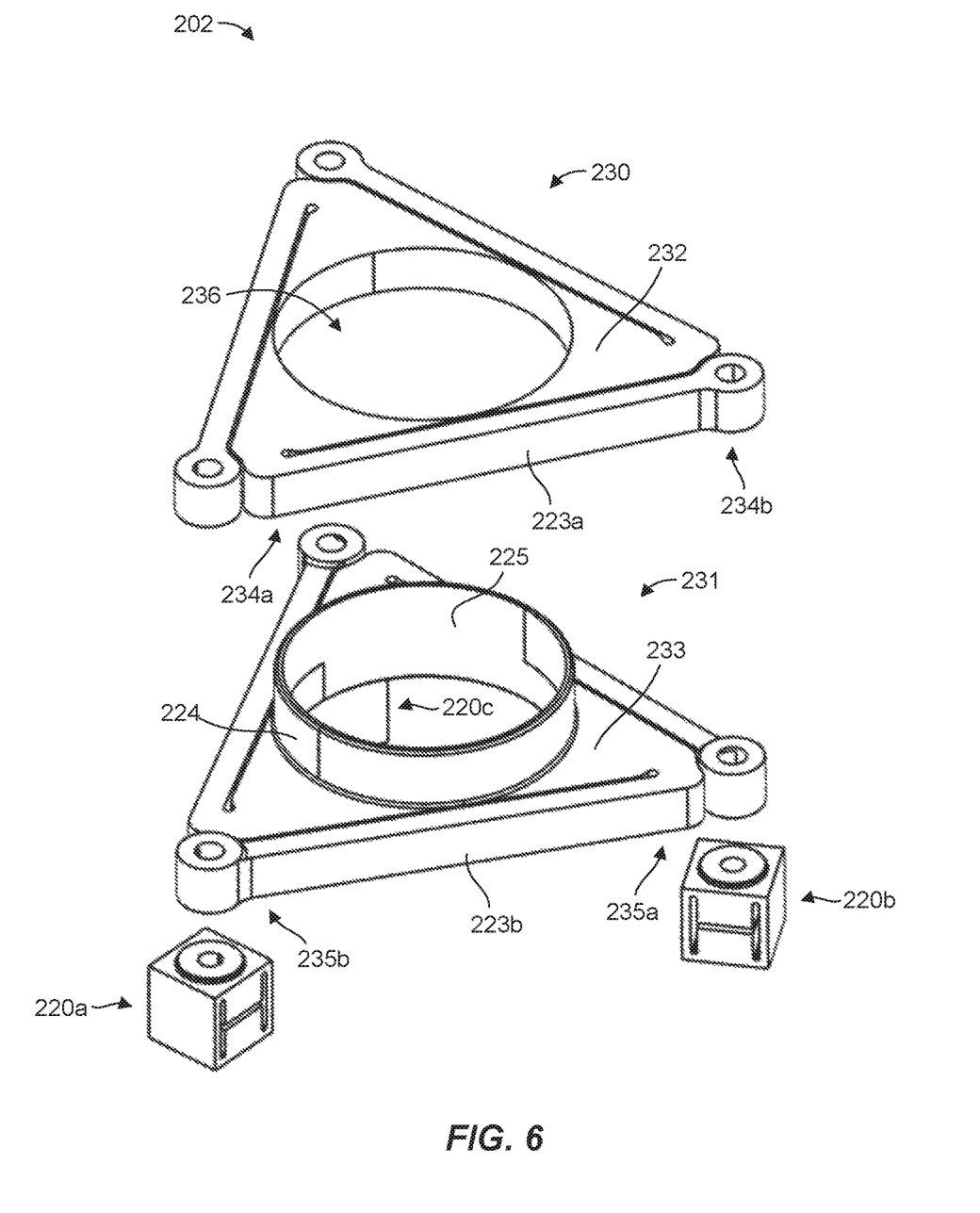
FIG. 6 is an exploded view of the flexure mount of FIGS. 5A and 5B.

FIGS. 5A and 5B illustrate a flexure mount 202 in accordance with another example of the present disclosure. The flexure mount 202 can be configured to provide radial and axial compliance and can therefore serve as an alternative to the second flexure mount 102 discussed above. An exploded view of the flexure mount 202 is shown in FIG. 6.

As with the second flexure mount 102, the flexure mount 202 can include radial flexures 220a-c that are configured to be radially compliant. In one aspect, the radial flexures 220a-c can be configured such that radial compliance is only provided for thermal expansion/contraction while providing stiffness under mechanical loads (e.g., static and/or dynamic loads, such as vibrations). For example, the radial flexures 220a-c can be oriented, such that they are compliant radially under thermoelastic growth/shrinkage, and such that each set or group of radial flexures 220a-c provides stiffness under radial or lateral mechanical loads. As illustrated, this can be accomplished by spacing the radial flexures 220a-c circumferentially about a longitudinal axis 205 (e.g., equally spaced at 120 degrees from one another) and orienting each flexure for radial compliance. Because each of the radial flexures 220a-c can be configured to be stiff transverse to its compliant direction (i.e., the radial direction), at least two of the radial flexures 220a-c can provide stiffness that resists lateral mechanical displacements. Thus, the set or group of radial flexures 220a-c can provide radial compliance to accommodate thermoelastic growth or shrinkage while also providing stiffness in other (e.g., lateral) degrees of freedom for mechanical loads. In the illustrated embodiment, the radial flexures 220a-c are configured as blade flexures. In particular, each of the radial flexures 220a-c comprises a pair of blade flexures in a parallel configuration (see, e.g., representative blade flexures 222a, 222b of the radial flexure 220a in FIG. 5A). It should be recognized that the illustrated embodiment is not intended to be limiting in any way and that any of the radial flexures 220a-c can comprise any suitable type of flexure in any number or configuration in accordance with the principles disclosed herein.

In addition, the flexure mount 202 can include axial flexures 221a-c that are configured to be axially compliant. For example, the axial flexures 221a-c can include a plurality of cantilevered beam flexures (see, e.g., cantilevered beam flexures 223a, 223b of the flexure 221a in FIGS. 5A and 5B), which can be tangentially oriented about a circumference of the longitudinal axis 205. In the illustrated embodiment, the flexure mount 202 comprises two flexure mount portions 230, 231. Each flexure mount portion 230, 231 includes a set or group of the respective cantilevered beam flexures 223a, 223b. For example, the first flexure mount portion 230 includes a first set or group of the cantilevered beam flexures 223a, and the second flexure mount portion 231 includes a second set or group of the cantilevered beam flexures 223b. In the illustrated embodiment, the groups of cantilevered beam flexures 223a, 223b each comprise three cantilevered beams in a triangle configuration. The cantilevered beam flexures 223a, 223b can be cantilevered from respective supporting flexure bases 232, 233 of the respective flexure mount portions 230, 231. Thus, the first set of cantilevered beam flexures 223a can have fixed ends 234a at the first flexure base 232, and the second set of cantilevered beam flexures 223b can have fixed ends 235a at the flexure base 233.

The free ends 234b, 235b of the cantilevered beam flexures 223a, 223b are free relative to the respective flexure bases 232, 233 and can be configured to couple to adjacent beam free ends and to the radial flexures 220a-c when stacked (e.g., with coupling features such as holes, openings, etc. configured to receive a fastener, not shown). The flexure bases 232, 233 can be coupled to one another via a collar 224 protruding or extending from the second flexure base 233 at least partially into an opening 236 in the first flexure base 232 and secured in any suitable manner (e.g., interference fit, adhesive, weld, etc.). The collar 224 can have an interface surface 225 configured to engage and interface with a supported structure for coupling the flexure mount 202 to the supported structure.

In one aspect, the cantilevered beam flexures 223a, 223b can be configured, such that fixed ends 234a, 235a and free ends 234b, 235b of the cantilevered beam flexures 223a, 223b are oriented end-to-end in a clockwise or a counterclockwise direction about a circumference of the axis 205 when viewed from a top side of the flexure mount 202 (top side shown in FIGS. 5A and 6). For example, the first set or group of cantilevered beam flexures 223a can have fixed ends 234a and free ends 234b oriented end-to-end in a counterclockwise direction (see FIGS. 5A and 6), and the second set or group of cantilevered beam flexures 223b can have fixed ends 235a and free ends 235b oriented end-to-end in a clockwise direction (see FIGS. 5B and 6) when viewed from the top side of the flexure mount 202. The groups of cantilevered beam flexures 223a, 223b can be stacked along the axis 205 such that corresponding or adjacent cantilevered beam flexures 223a, 223b form the axial flexures 221a-c. This opposite orientation of the cantilevered beam flexures 223a, 223b can serve to provide axial compliance and movement of a supported structure parallel to the axis 205 without rotation of the supported structure about the axis 205. In other words, pairing oppositely "clocked" cantilevered beams to form the axial flexures 221a-c provides rotation canceling, which avoids the rotation that would occur with only a single direction or orientation of the cantilevered beam flexures 223a, 223b. Avoiding rotational asymmetry in the configuration of the cantilevered beam flexures 223a, 223b can therefore provide only axial compliance and translation (i.e., non-rotational movement) of a supported structure.

In one aspect, the relatively long cantilevered beam flexures 223a, 223b can provide a low axial spring constant for their volume compared to other flexure types, while being stiff tangentially (i.e., parallel to a given cantilevered beam flexure). This attribute may be beneficial when axial thermoelastic growth differential is large, the supported structure cannot tolerate a large axial spring constant, and/or there is a constraint on the volume of the flexure.

In one aspect, the flexure mount 202 can include a circumferential flexure, as described above, by incorporating the circumferential flexure into the protrusion 230.

In accordance with one example of the present invention, a method is disclosed for facilitating support of a structure and accommodating thermal expansion. The method can comprise providing a first flexure mount operable to couple to a base and a supported structure, the first flexure mount having a first radial flexure. The method can also comprise providing a second flexure mount operable to couple to the base and the supported structure along an axis, the second flexure mount having a second radial flexure and an axial flexure, wherein the first and second radial flexures are operable to provide radial compliance relative to the axis and the axial flexure is operable to provide axial compliance parallel to the axis, such that the first flexure mount is radially compliant, and the second flexure mount is radially and axially compliant. In one aspect of the method, at least one of the first and second radially compliant flexures comprises three radially compliant flexures spaced circumferentially about the axis. In another aspect of the method, the first flexure mount, the second flexure mount, or both comprises a circumferential flexure operable to provide circumferential compliance about the axis, such that the first flexure mount, the second flexure mount, or both is circumferentially compliant. It is noted that no specific order is required in this method, though generally in one embodiment, these method steps can be carried out sequentially.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A flexure mount system, comprising:
   a base;
   a first flexure mount coupled to the base, the first flexure mount having a first radial flexure and no axial flexure;
   a second flexure mount coupled to the base, the second flexure mount having a second radial flexure and an axial flexure; and
   a supported structure coupled to the first and second flexure mounts along an axis,
   wherein the first and second radial flexures are operable to provide radial compliance relative to the axis and the axial flexure is operable to provide axial compliance parallel to the axis,
   such that the first flexure mount is radially compliant without axial compliance, and the second flexure mount is radially and axially compliant, providing stiffness under lateral and axial mechanical loading.

2. The flexure mount system of claim 1, wherein at least one of the first and second radially compliant flexures comprises a plurality of blade flexures in a parallel configuration.

3. The flexure mount system of claim 1, wherein at least one of the first and second radially compliant flexures comprises three radially compliant flexures spaced circumferentially about the axis.

4. The flexure mount system of claim 1, wherein the axially compliant flexure comprises a plurality of blade flexures in a parallel configuration.

5. The flexure mount system of claim 1, wherein the axially compliant flexure comprises a plurality of cantilevered beam flexures tangentially oriented about a circumference of the axis.

6. The flexure mount system of claim 5, wherein the plurality of cantilevered beam flexures is configured such that fixed and free ends of the cantilevered beam flexures are oriented end-to-end in a clockwise or a counterclockwise direction about the circumference of the axis.

7. The flexure mount system of claim 6, wherein the plurality of cantilevered beam flexures comprises a first group with fixed and free ends oriented end-to-end in a clockwise direction, and a second group with fixed and free ends oriented end-to-end in a counterclockwise direction, and wherein the first and second groups are stacked along the axis.

8. The flexure mount system of claim 7, wherein the first and second groups each comprise three cantilevered beams in a triangle configuration.

9. The flexure mount system of claim 1, wherein the first flexure mount, the second flexure mount, or both comprises a circumferential flexure operable to provide circumferential compliance about the axis, such that the first flexure mount, the second flexure mount, or both is circumferentially compliant.

10. The flexure mount system of claim 9, wherein the circumferential flexure comprises a plurality of blade flexures arranged in a serpentine configuration.

11. The flexure mount system of claim 1, wherein at least one of the first radial flexure, the second radial flexure, or the axial flexure comprises a pin flexure, a blade flexure, a notch flexure, or a combination thereof.

12. The flexure mount system of claim 1, wherein the supported structure is coupled to at least one of the first flexure mount or the second flexure mount by a fastener, an adhesive, a pin, or a combination thereof.

13. The flexure mount system of claim 1, wherein two or more of the base, the first flexure mount, the second flexure mount, and the supported structure comprise materials having different coefficients of thermal expansion.

14. The flexure mount system of claim 1, wherein the supported structure is an integrated Dewar cooler assembly.

15. A flexure mount system, comprising:
    a first flexure mount having a first radial flexure operable to provide radial compliance relative to an axis, and no axial flexure operable to provide axial compliance parallel to the axis; and
    a second flexure mount having a second radial flexure operable to provide radial compliance relative to the axis, and an axial flexure operable to provide axial compliance parallel to the axis,
    such that the first flexure mount is radially compliant without axial compliance, and the second flexure mount is radially and axially compliant, providing stiffness under lateral and axial mechanical loading.

16. The flexure mount system of claim 15, wherein at least one of the first or second radial flexures comprises a plurality of blade flexures in a parallel configuration.

17. The flexure mount system of claim 15, wherein at least one of the first or second radial flexures comprises three radial flexures spaced circumferentially about the axis.

18. The flexure mount system of claim 15, wherein the axial flexure comprises a plurality of blade flexures in a parallel configuration.

19. The flexure mount system of claim 15, wherein the axial flexure comprises a plurality of cantilevered beam flexures tangentially oriented about a circumference of the axis.

20. The flexure mount system of claim 19, wherein the plurality of cantilevered beam flexures is configured such that fixed and free ends of the cantilevered beam flexures are oriented end-to-end in a clockwise or a counterclockwise direction about the circumference of the axis.

21. The flexure mount system of claim 20, wherein the plurality of cantilevered beam flexures comprises a first group with fixed and free ends oriented end-to-end in a clockwise direction, and a second group with fixed and free ends oriented end-to-end in a counterclockwise direction, and wherein the first and second groups are stacked along the axis.

22. The flexure mount system of claim 21, wherein the first and second groups each comprise three cantilevered beams in a triangle configuration.

23. The flexure mount system of claim 15, wherein at least one of the first or second flexure mounts further comprises a circumferential flexure operable to provide circumferential compliance about the axis, such that the at least one of the first or second flexure mounts is circumferentially compliant.

24. The flexure mount system of claim 23, wherein the circumferential flexure comprises a plurality of blade flexures arranged in a serpentine configuration.

25. The flexure mount system of claim 15, wherein at least one of the first radial flexure, the second radial flexure, or the axial flexure comprises a pin flexure, a blade flexure, a notch flexure, or a combination thereof.

26. A method for facilitating support of a structure and accommodating thermal expansion, comprising:
   providing a first flexure mount operable to couple to a base and a supported structure, the first flexure mount having a first radial flexure and no axial flexure; and
   providing a second flexure mount operable to couple to the base and the supported structure along an axis, the second flexure mount having a second radial flexure and an axial flexure,
   wherein the first and second radial flexures are operable to provide radial compliance relative to the axis and the axial flexure is operable to provide axial compliance parallel to the axis,
   such that the first flexure mount is radially compliant without axial compliance, and the second flexure mount is radially and axially compliant, providing stiffness under lateral and axial mechanical loading.

27. The method of claim 26, wherein at least one of the first and second radially compliant flexures comprises three radially compliant flexures spaced circumferentially about the axis.

28. The method of claim 26, wherein the first flexure mount, the second flexure mount, or both comprises a circumferential flexure operable to provide circumferential compliance about the axis, such that the first flexure mount, the second flexure mount, or both is circumferentially compliant.

* * * * *